United States Patent
Ochi et al.

(10) Patent No.: US 12,132,724 B2
(45) Date of Patent: Oct. 29, 2024

(54) INFORMATION PROCESSING DEVICE AND NON-TRANSITORY COMPUTER-READABLE STORAGE MEDIUM

(71) Applicant: Oki Electric Industry Co., Ltd., Tokyo (JP)

(72) Inventors: Kengo Ochi, Tokyo (JP); Tsutomu Iwasaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 237 days.

(21) Appl. No.: 17/749,064

(22) Filed: May 19, 2022

(65) Prior Publication Data

US 2022/0417236 A1 Dec. 29, 2022

(30) Foreign Application Priority Data

Jun. 23, 2021 (JP) ................................ 2021-103790

(51) Int. Cl.
*H04W 12/069* (2021.01)
*H04L 9/40* (2022.01)
*H04W 12/61* (2021.01)

(52) U.S. Cl.
CPC ...... *H04L 63/0823* (2013.01); *H04L 63/0876* (2013.01); *H04L 63/20* (2013.01)

(58) Field of Classification Search
CPC . H04L 63/0823; H04L 63/0876; H04L 63/20; H04L 63/18; H04W 12/069; H04W 12/61
See application file for complete search history.

(56) References Cited

U.S. PATENT DOCUMENTS

| | | | |
|---|---|---|---|
| 8,850,186 B2 * | 9/2014 | Yamauchi | H04L 9/3268 |
| | | | 713/157 |
| 2018/0124040 A1 * | 5/2018 | Watson | H04W 12/082 |
| 2018/0241574 A1 * | 8/2018 | Kakutani | H04L 9/3247 |
| 2020/0021575 A1 * | 1/2020 | Rezvani | H04L 63/20 |

FOREIGN PATENT DOCUMENTS

JP 2008042381 A * 2/2008

OTHER PUBLICATIONS

European Office Action dated Mar. 19, 2024, in the counterpart European Patent Application No. 22174043.4.

* cited by examiner

*Primary Examiner* — Joseph P Hirl
*Assistant Examiner* — Aayush Aryal
(74) *Attorney, Agent, or Firm* — Rabin & Berdo, P.C.

(57) ABSTRACT

An information processing device includes: a storage configured to store an electronic certificate used for authentication for using a network; a detector configured to detect whether a time to renew the electronic certificate has arrived; and a communication unit having a first communication mode in which the communication unit communicates with an external device via the network and a second communication mode in which the communication unit communicates with a certificate renewal device without using the network. The communication unit connects with the certificate renewal device in the second communication mode and receives an electronic certificate for renewing the electronic certificate from the certificate renewal device, on a basis of the detection by the detector.

10 Claims, 9 Drawing Sheets

| ATTRIBUTE NAME | VALUE |
|---|---|
| X.509 VERSION | 3 |
| SERIAL NUMBER | 10001 |
| CERTIFICATE ISSUER | ABC-company CA |
| VALIDITY PERIOD | 01/01/2020 TO 12/31/2020 |
| SUBJECT | Printer-1 |
| PUBLIC KEY | rsaEncryption ( 1024-BIT STRING ) |

| ATTRIBUTE NAME | VALUE |
|---|---|
| X.509 VERSION | 3 |
| SERIAL NUMBER | 10002 |
| CERTIFICATE ISSUER | ABC-company CA |
| VALIDITY PERIOD | 12/01/2020 TO 12/31/2021 |
| SUBJECT | Printer-1 |
| PUBLIC KEY | rsaEncryption ( 1024-BIT STRING ) |

INFORMATION PROCESSING DEVICE AND NON-TRANSITORY COMPUTER-READABLE STORAGE MEDIUM

BACKGROUND OF THE INVENTION

1. Field of the Invention

The present disclosure relates to an information processing device and a non-transitory computer-readable storage medium, and is preferably applied to an information processing device that renews an electronic certificate installed in the information processing device.

2. Description of the Related Art

Conventionally, there is a technique that, when it is time to renew an electronic certificate installed in a device, displays a procedure for renewing the electronic certificate on a display of the device (see, e.g., Japanese Patent Application Publication No. 2008-42381).

However, in such a technique, the procedure for renewing the certificate is troublesome for a user unfamiliar with certificate renewal.

SUMMARY OF THE INVENTION

An object of the present disclosure is to provide an information processing device and a non-transitory computer-readable storage medium capable of saving time and effort of a user.

According to an aspect of the present disclosure, there is provided an information processing device including: a storage configured to store an electronic certificate used for authentication for using a network; a detector configured to detect whether a time to renew the electronic certificate has arrived; and a communication unit having a first communication mode in which the communication unit communicates with an external device via the network and a second communication mode in which the communication unit communicates with a certificate renewal device without using the network, wherein the communication unit connects with the certificate renewal device in the second communication mode and receives an electronic certificate for renewing the electronic certificate from the certificate renewal device, on a basis of the detection by the detector.

According to another aspect of the present disclosure, there is provided an information processing device including: a storage configured to store an electronic certificate used for authentication for using a network; a detector configured to detect whether the electronic certificate is stored in the storage and is valid; and a communication unit having a first communication mode in which the communication unit communicates with an external device via the network and a second communication mode in which the communication unit communicates with a certificate renewal device without using the network, wherein the communication unit connects with the certificate renewal device in the second communication mode and receives a new electronic certificate from the certificate renewal device, on a basis of the detection by the detector.

According to another aspect of the present disclosure, there is provided a non-transitory computer-readable storage medium storing a program for causing a computer to execute a process including: detecting a request from an information processing device for an electronic certificate used for authentication for using a network; connecting with the information processing device without using the network in response to the request; and transmitting the electronic certificate to the connected information processing device.

DETAILED DESCRIPTION OF THE INVENTION

Embodiments of the present disclosure will be described below with reference to the drawings.

According to a first aspect of the present disclosure, there is provided an information processing device including a storage configured to store an electronic certificate used for authentication for using a network, a detector configured to detect whether a time to renew the electronic certificate has arrived, and a communication unit (or communication interface) having a first communication mode in which the communication unit communicates with an external device via the network and a second communication mode in which the communication unit communicates with a certificate renewal device without using the network, wherein the communication unit connects with the certificate renewal device in the second communication mode and receives an electronic certificate for renewing the electronic certificate from the certificate renewal device, on the basis of the detection by the detector.

In a first embodiment to be described later, a printer 10 serves as the information processing device (see FIG. 1). A certificate storage 28 serves as the storage, a controller 20 serves as the detector, and a communication unit 21 serves as the communication unit (see FIG. 2). A network NT2 serves as the network (see FIG. 1). A personal computer (PC) 16 serves as the external device and certificate renewal device. Thus, the external device and certificate renewal device are the same device.

In a second embodiment to be described later, a printer 110 serves as the information processing device (see FIG. 8). A certificate storage 28 serves as the storage, a controller 120 serves as the detector, and a communication unit 21 serves as the communication unit (see FIG. 2). A network NT2 serves as the network (see FIG. 8). A personal computer (PC) 16 serves as the external device, and a certificate renewal device 60 serves as the certificate renewal device. Thus, the external device and certificate renewal device are separate devices.

In an example, when the detector detects that the time to renew the electronic certificate has arrived, the communication unit connects with the certificate renewal device in the second communication mode in which the information processing device operates as an access point.

In an example, the information processing device further includes a generator configured to generate connection information for connecting with the certificate renewal device in the second communication mode, and the communication unit communicates with the certificate renewal device in the second communication mode on the basis of the connection information. In the first embodiment, the controller 20 serves as the generator (see FIG. 2). In the second embodiment, the controller 120 serves as the generator (see FIG. 2).

In an example, the communication unit communicates with the certificate renewal device in the second communication mode on the basis of the connection information, via short-distance wireless communication.

In an example, when a specified time within a period from a time a predetermined time before expiration of the electronic certificate to a time of expiration of the electronic certificate has arrived, the detector detects that the time to renew the electronic certificate has arrived, and when the detector detects that the time to renew the electronic certificate has arrived, the communication unit connects with the certificate renewal device in the second communication mode and receives the electronic certificate for renewing the electronic certificate from the certificate renewal device. As such, the time to renew the electronic certificate may be a specified time within a period from a time a predetermined time before expiration of the electronic certificate to a time of expiration of the electronic certificate.

In an example, when the electronic certificate has expired, the detector detects that the time to renew the electronic certificate has arrived. As such, the time to renew the electronic certificate may be a time of expiration of the electronic certificate. This will be described in the first embodiment.

In an example, when a time a predetermined time before expiration of the electronic certificate has arrived, the detector detects that the time to renew the electronic certificate has arrived. As such, the time to renew the electronic certificate may be a time a predetermined time before expiration of the electronic certificate. This will be described in the second embodiment.

According to a second aspect of the present disclosure, there is provided an information processing device including a storage configured to store an electronic certificate used for authentication for using a network, a detector configured to detect whether the electronic certificate is stored in the storage and is valid, and a communication unit having a first communication mode in which the communication unit communicates with an external device via the network and a second communication mode in which the communication unit communicates with a certificate renewal device without using the network, wherein the communication unit connects with the certificate renewal device in the second communication mode and receives a new electronic certificate from the certificate renewal device, on the basis of the detection by the detector.

Figure 1:
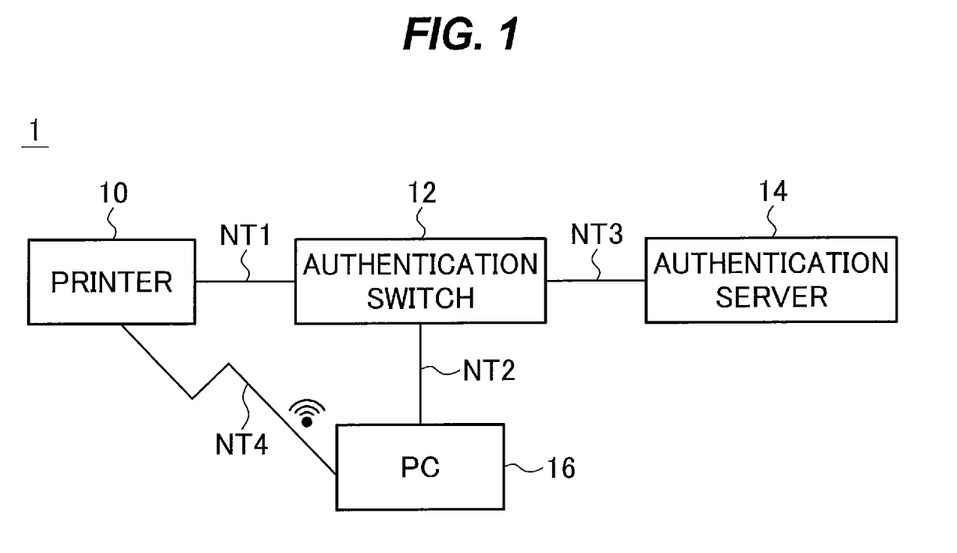
FIG. 1 is a block diagram illustrating an overall configuration of an electronic certificate renewal system according to a first embodiment.

In the first embodiment, the printer 10 may serve as the information processing device (see FIG. 1). The certificate storage 28 may serve as the storage, the controller 20 may serve as the detector, and the communication unit 21 may serve as the communication unit (see FIG. 2). The network NT2 may serve as the network (see FIG. 1). The PC 16 may serve as the external device and certificate renewal device. Thus, the external device and certificate renewal device may be the same device.

Figure 8:
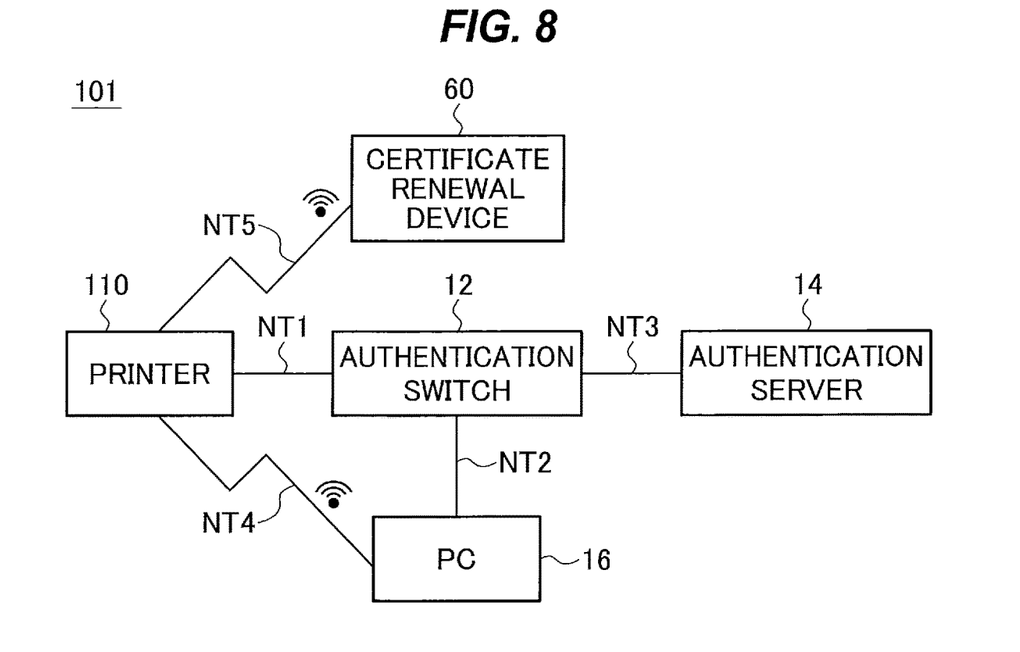
FIG. 8 is a block diagram illustrating an overall configuration of an electronic certificate renewal system according to a second embodiment.

In the second embodiment, the printer 110 may serve as the information processing device (see FIG. 8). The certificate storage 28 may serve as the storage, the controller 120 may serve as the detector, and the communication unit 21 may serve as the communication unit (see FIG. 2). The network NT2 may serve as the network (see FIG. 8). The PC 16 may serve as the external device, and the certificate renewal device 60 may serve as the certificate renewal device. Thus, the external device and certificate renewal device may be separate devices.

In an example, the detector detects whether the electronic certificate is stored in the storage, and when the detector detects that the electronic certificate is not stored in the storage, the communication unit connects with the certificate renewal device in the second communication mode and receives the new electronic certificate.

In an example, when the electronic certificate is stored in the storage, the detector detects whether the information processing device is not authenticated using the stored electronic certificate by a server (or whether the stored electronic certificate is determined to be invalid by a server), and when the detector detects that the information processing device is not authenticated using the electronic certificate by the server (or that the electronic certificate is determined to be invalid by the server), the communication unit connects with the certificate renewal device in the second communication mode and receives the new electronic certificate. In the first and second embodiments, the authentication server 14 may serve as the server.

In each of the first and second aspects, when connecting with the certificate renewal device in the second communication mode, the communication unit may transmit a request for an electronic certificate used for the authentication for using the network, to the certificate renewal device. The communication unit may transmit a service set identifier (SSID) of the information processing device as the request. The communication unit may transmit identification information for the information processing device held by the information processing device, to the certificate renewal device.

In each of the first and second aspects, the certificate renewal device, which may be a computer, may detect a request from the information processing device for an electronic certificate used for authentication for using the network, connect with the information processing device without using the network in response to the request, and transmit the electronic certificate to the connected information processing device. The certificate renewal device may detect an SSID of the information processing device as the request from the information processing device, and connect with the information processing device by using a password corresponding to the SSID. The certificate renewal device may obtain identification information for the information processing device held by the information processing device, and transmit, to the information processing device, the electronic certificate corresponding to the identification information. The certificate renewal device may include processing circuitry that performs the above process of the certificate renewal device. The processing circuitry may be implemented by hardware, software, or a combination thereof. For example, the certificate renewal device may include a memory that stores a program, and a processor that executes the program to perform the above process of the certificate renewal device. The program may be stored and provided in a non-transitory computer-readable storage medium. In the first embodiment, a controller 40 may serve as the processing circuitry or processor, and a memory 49 may serve as the memory (see FIG. 3). In the second embodiment, a controller 62 may serve as the processing circuitry or processor, and a memory 69 may serve as the memory (see FIG. 9).

In the first aspect, when the time to renew the electronic certificate has arrived, the information processing device can receive the electronic certificate for renewing the electronic certificate from the certificate renewal device without using the network requiring the electronic certificate.

The present disclosure can provide an information processing device and a program capable of saving time and effort of a user.

Hereinafter, electronic certificates may be referred to simply as certificates.

1. First Embodiment

<1-1. Configuration of Electronic Certificate Renewal System>

As illustrated in FIG. 1, an electronic certificate renewal system 1 includes the printer 10, an authentication switch 12, an authentication server 14, and the personal computer (PC) 16, which are installed, for example, in one company. The printer 10, authentication switch 12, authentication server 14, and PC 16 are connected to each other via a network NT1, the network NT2, and a network NT3, which are, for example, wired local area networks (LANs) in a company.

The printer 10 is connected to the authentication switch 12 via the network NT1. The printer 10 is authorized to communicate to the network NT2, through IEEE 802.1X EAP-TLS authentication by the authentication server 14. A client certificate that is an electronic certificate unique to the printer 10 is installed in the printer 10 as a certificate used for the EAP-TLS authentication. To communicate to the network NT2, the printer 10 needs to periodically renew the certificate.

In an infrastructure mode as the first communication mode in which printing is performed, for example, the printer 10 communicates by wire with the PC 16 via the networks NT1 and NT2, and upon receiving a print job from the PC 16, prints print data indicated by the print job on a predetermined medium.

Figure 4:
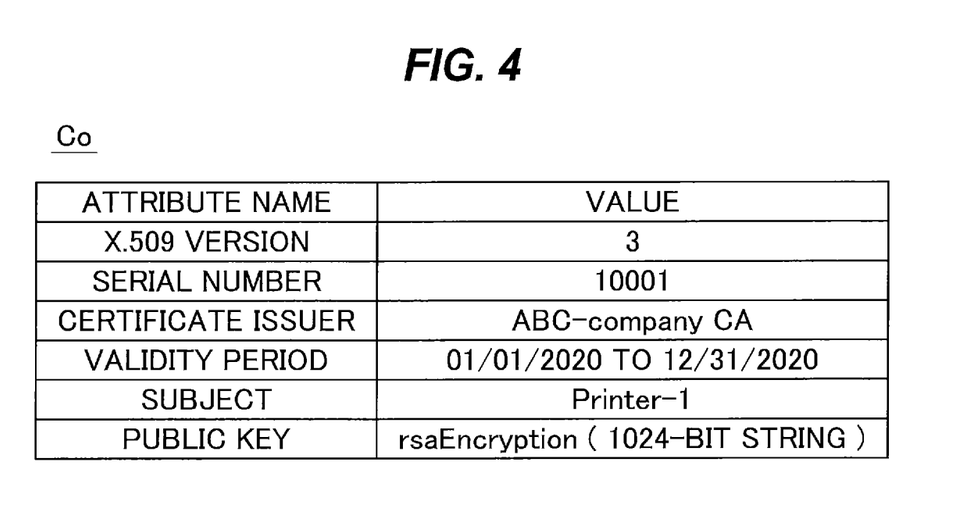
FIG. 4 is a diagram illustrating an example of a certificate installed in the printer.
Figure 5:
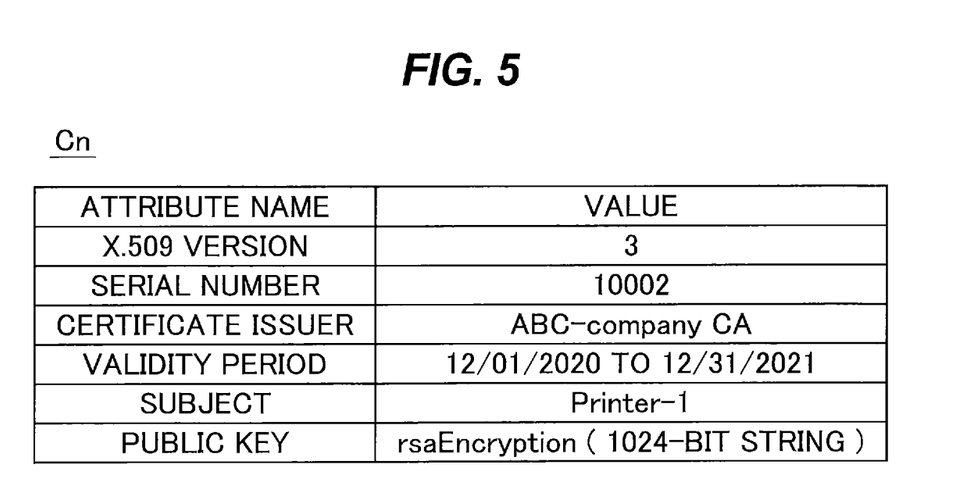
FIG. 5 is a diagram illustrating an example of a certificate after expiration period renewal.

In an access point mode as the second communication mode in which the printer 10 starts and operates as a wireless access point and is connected from the PC 16, the printer 10 is wirelessly connected from the PC 16 and a certificate (e.g., certificate Co in FIG. 4) in the certificate storage 28 (see FIG. 2) is replaced with a new certificate (e.g., certificate Cn in FIG. 5). In the access point mode, the printer 10 performs short-distance wireless communication as wireless communication with the PC 16 via a network NT4 without using the networks NT1 and NT2.

The authentication switch 12, which is an access point for authentication, is connected to the printer 10 via the network NT1, the PC 16 via the network NT2, and the authentication server 14 via the network NT3. When the printer 10 is authenticated by the authentication server 14, the authentication switch 12 allows the printer 10 to communicate to the network NT2. On the other hand, when the printer 10 is not authenticated by the authentication server 14, the authentication switch 12 does not allow the printer 10 to communicate to the network NT2.

The authentication server 14 performs IEEE 802.1X EAP-TLS authentication on a certificate transmitted from the printer 10. For example, when the certificate stored in the printer 10 is expired, the authentication server 14 determines that the certificate is invalid, and does not authenticate the printer 10.

The printer 10 is assigned "Printer-1" as a name (hereinafter referred to as a printer name) identifying the printer 10. When the printer 10 activates a wireless access point to place itself in the access point mode, the printer 10 generates an SSID and a password as connection information on the basis of the printer name of the printer 10 in the controller 20 (see FIG. 2) as the generator. In this embodiment, the printer 10 combines the printer name to generate "expired-printer-1" as the SSID and "key-printer-1" as the password. The SSID of the printer 10 in the access point mode is an SSID dedicated to certificate renewal, and is a character string that is generated separately and different from an SSID of the printer 10 in the infrastructure mode.

The PC 16 rewrites the certificate (e.g., certificate Co in FIG. 4) installed in the certificate storage 28 (see FIG. 2) of the printer 10 with a new certificate (e.g., certificate Cn in FIG. 5). The PC 16 has a wireless communication function, and is located at a position where the PC 16 can wirelessly communicate with the printer 10 when the printer 10 enters the access point mode and activates the wireless access point. The PC 16 is connected to the printer 10 via the network NT4, which is a wireless network.

<1-1-1. Configuration of Printer>

Figure 2:
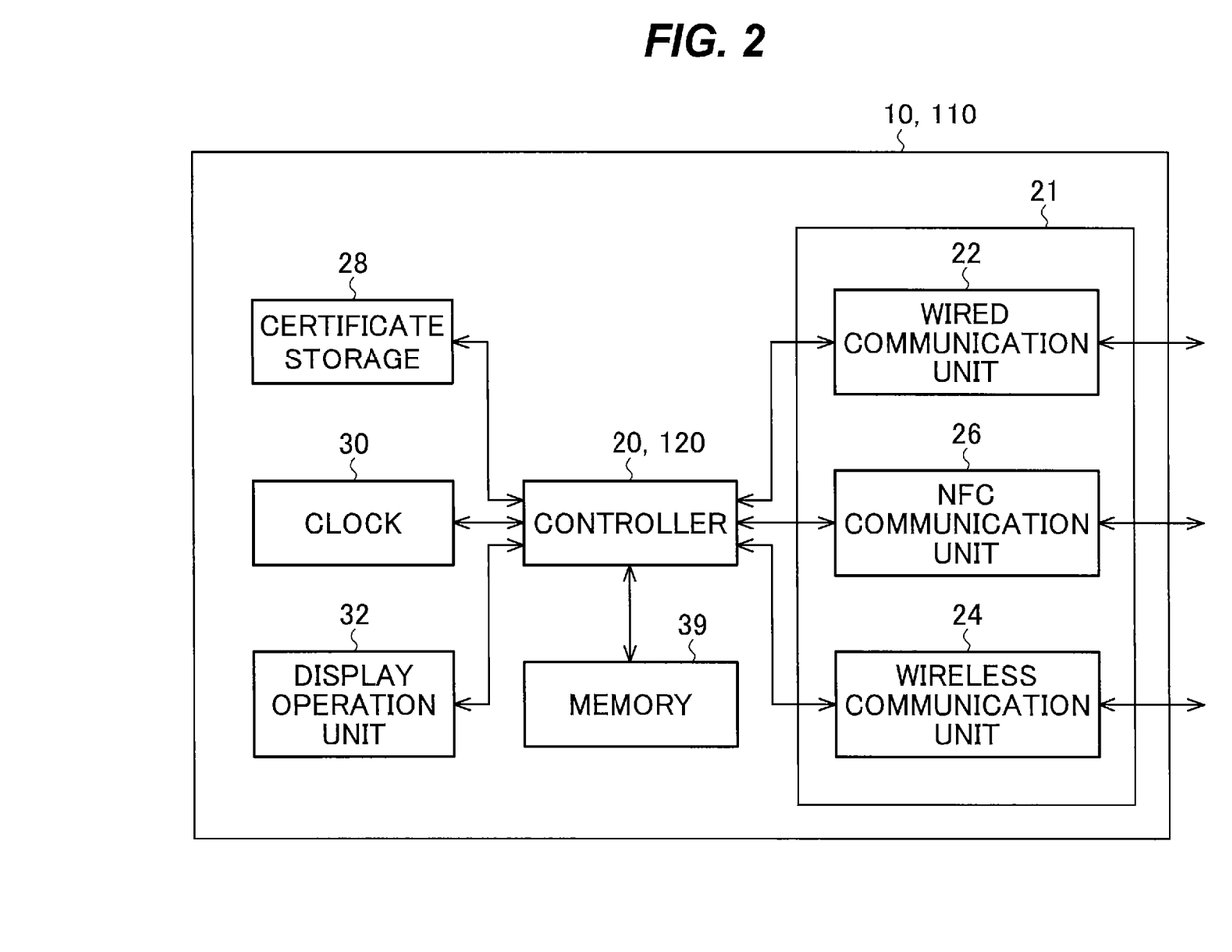
FIG. 2 is a block diagram illustrating a configuration of a printer.

As illustrated in FIG. 2, the printer 10 includes the controller 20, the communication unit 21, the certificate storage 28, a clock 30, and a display operation unit 32. The controller 20, which is or includes a processor, such as a central processing unit (CPU), reads predetermined programs from a memory 39 and controls the printer 10. The display operation unit 32, which is or includes, for example, a touch screen, outputs information to a user and receives operation inputs from a user. The clock 30 obtains the current date.

The communication unit 21 includes a wired communication unit 22, a wireless communication unit 24, and a near field communication (NFC) communication unit 26.

The wired communication unit 22, which is, for example, a wired local area network (LAN) board installed in the printer 10, is connected to the network NT1 via a wired LAN cable and transmits and receives data to and from the outside via the network NT1. The wireless communication unit 24, which is, for example, a wireless LAN board installed in the printer 10, serves as a wireless access point, establishes wireless communication according to Wi-Fi (registered trademark) as short-distance wireless communication with the PC 16 or the like, and transmits and receives data. The NFC communication unit 26 has a near field communication (NFC) communication function, which is a short-distance wireless communication function, and when an NFC communication unit of a communication device (e.g., a mobile terminal) (not illustrated) having an NFC communication function is placed over the NFC communication unit 26 and brought into a predetermined range close to the NFC communication unit 26, performs NFC communication with the NFC communication unit of the communication device and transmits and receives data.

The certificate storage 28 is a storage that stores a certificate used by the printer 10. In this embodiment, the certificate storage 28 stores a certificate used for IEEE 802.1X authentication. FIG. 4 illustrates certificate Co, which is an example of the certificate stored in the certificate storage 28. In FIG. 4, certificate Co complies with the X.509 format, and the attribute names of the main information items contained in certificate Co include X.509 version, serial number, certificate issuer, validity period, subject, and public key. In the field of X.509 version, the value "3", which is defined by the standard, is specified. In the field of serial number, the value "10001", which is a unique number for certificate Co assigned by the issuer of certificate Co, is specified. In the field of certificate issuer, the value "ABC-company CA", which is a name of the organization that issues certificate Co, is specified. In the field of validity period, the value "01/01/2020 to 12/31/2020", which is the validity period of certificate Co, is specified. When the current date is 01/01/2021, certificate Co is expired. In the field of subject, the value "Printer-1", which is a name identifying the printer 10, is specified. The information in the field of subject, which serves as the identification information, indicates the subject to which certificate Co was issued. In the field of public key, information representing a public key used in the EAP-TLS authentication by the authentication server 14 is specified. In this embodiment, for example, a 1024-bit string in "RSA Encryption" format is specified in the field of public key.

In the above configuration, the controller 20 uses the certificate (e.g., certificate Co) stored in the certificate storage 28 to perform IEEE 802.1X authentication via the wired communication unit 22. Also, the controller 20 controls the wireless communication unit 24 to activate and deactivate the wireless access point, on the basis of the validity period of the stored certificate (e.g., certificate Co) and information indicating the current date obtained from the clock 30. This will be described in detail later.

<1-1-2. Configuration of PC>

Figure 3:
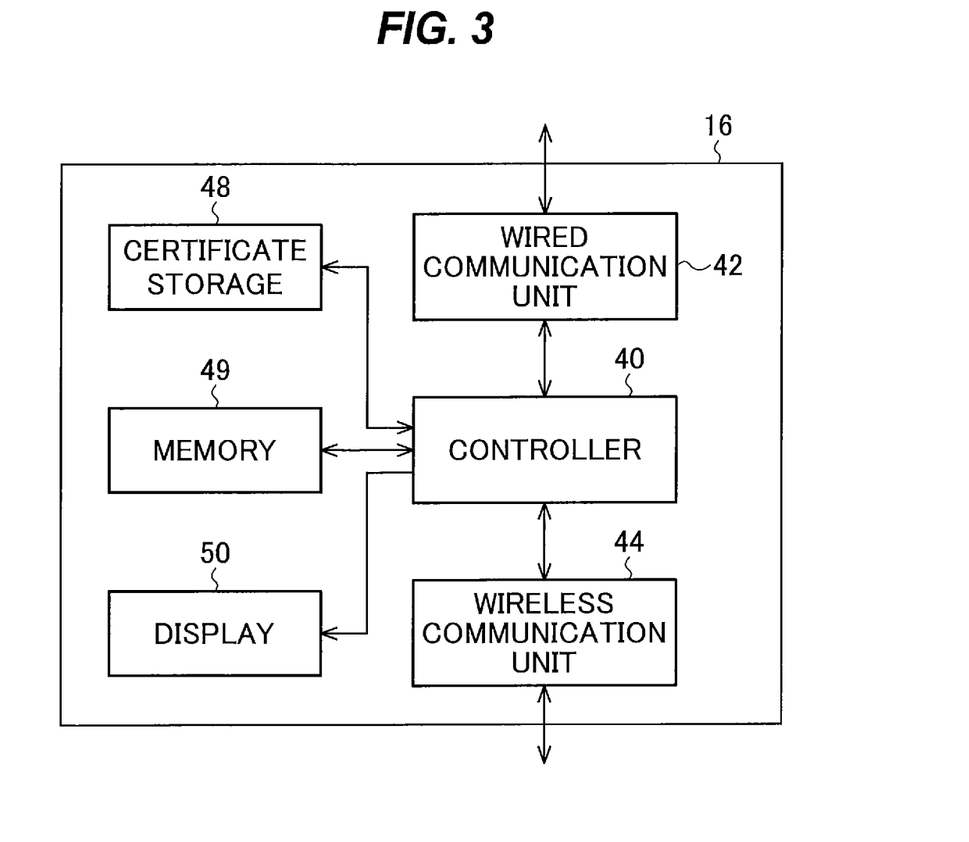
FIG. 3 is a block diagram illustrating a configuration of a PC.

As illustrated in FIG. 3, the PC 16 includes the controller 40, a wired communication unit 42, a wireless communication unit 44, a certificate storage 48, and a display 50. The controller 40, which is or includes a processor, such as a CPU, reads predetermined programs from the memory 49 and controls the PC 16. The display 50, which is, for example, a liquid crystal display, displays a result of certificate renewal.

The wired communication unit 42, which is, for example, a wired LAN board installed in the PC 16, is connected to the network NT2 via a wired LAN cable and transmits and receives data to and from the outside via the network NT2. The wireless communication unit 44, which is, for example, a wireless LAN board installed in the PC 16, establishes wireless communication according to Wi-Fi with the printer 10 serving as a wireless access point or other devices and transmits and receives data.

The certificate storage 48 is a storage that stores a new certificate (e.g., certificate Cn) for renewing the certificate (e.g., certificate Co) stored in the certificate storage 28 of the printer 10. FIG. 5 illustrates certificate Cn, which is an example of the certificate stored in the certificate storage 48. In FIG. 5, certificate Cn is different from certificate Co (see FIG. 4) in serial number and validity period. In the field of serial number, the value "10002", which is different from the serial number of certificate Co, is specified. In the field of validity period, the value "12/01/2020 to 12/31/2021", which is the validity period of certificate Cn, is specified. When the current date is 01/01/2021, certificate Cn is unexpired and valid.

In the above configuration, the controller 40 searches for the wireless access point to be searched for having the SSID indicating that the certificate stored in the printer 10 has expired, via the wireless communication unit 44. In this embodiment, the SSID of the wireless access point activated by the printer 10 with its certificate expired is an SSID starting with "expired-". When the SSID to be searched for is found, the controller 40 connects to the SSID according to the Wi-Fi protected access 2 pre-shared key (WPA2-PSK) protocol, using as a password a character string obtained by combining "key-" and the character string following "expired-" of the SSID. In this embodiment, since the SSID of the wireless access point activated by the printer 10 is "expired-printer-1", the password is "key-printer-1". Then, the controller 40 writes the certificate (e.g., certificate Cn) stored in the certificate storage 48 into the certificate storage 28 of the printer 10 that has been found and whose certificate has expired, via the wireless communication unit 44.

<1-2. Certificate Renewal Process by Printer>

Next, a certificate renewal process by the printer 10 will be described using the flowchart illustrated in FIG. 6. The controller 20 starts a certificate renewal process RT1 illustrated in FIG. 6 by reading a certificate renewal program from the memory 39 and executing it, and proceeds to step SP1. At this time, the printer 10 is in the infrastructure mode. In the certificate renewal process RT1, the controller 20 sets a time to renew the certificate stored in the certificate storage 28 to the same date as the expiration date of the certificate stored in the certificate storage 28, determines whether the stored certificate has expired, and when it has expired, waits until a valid certificate is stored in the certificate storage 28 by the PC 16.

Here, it is assumed that certificate Co is stored in the certificate storage 28 and the current date is 01/01/2021. In this case, the certificate (i.e., certificate Co) stored in the certificate storage 28 of the printer 10 has expired (i.e., the time to renew has passed), the IEEE 802.1X authentication by the authentication server 14 is denied, and the printer 10 cannot connect to the network NT2. The following describes an operation from this state until the certificate stored in the certificate storage 28 is renewed and the printer 10 becomes able to connect to the network NT2 again.

In step SP1, the controller 20 of the printer 10 compares the validity period of the certificate stored in the certificate storage 28 with information indicating the current date obtained from the clock 30, and proceeds to step SP2. In step SP2, the controller 20 determines whether the current date is not within the validity period of the certificate and the certificate has expired. When the determination is negative, this indicates that the certificate is unexpired and valid, and the controller 20 returns to step SP1. The controller 20 repeats steps SP1 and SP2, and periodically checks whether the certificate has expired. On the other hand, when the determination in step SP2 is positive, this indicates that the certificate is expired and invalid, and the controller 20 proceeds to step SP3. Here, since the current date is 01/01/2021 and certificate Co has expired, the controller 20 makes a positive determination in step SP2.

In step SP3, the controller 20 controls the wireless communication unit 24 to activate the wireless access point, thereby placing the printer 10 into the access point mode, and proceeds to step SP4. At this time, the controller 20 sets the SSID of the activated wireless access point to the character string "expired-printer-1" generated from "expired-" and the printer name, and sets the password to the character string "key-printer-1" generated from "key-" and the printer name. At this time, the printer 10 is in a state in which it is asking the PC 16 for a new certificate.

When the printer 10 starts as a wireless access point, the PC 16 wirelessly connects to the printer 10 and replaces the certificate (here, certificate Co) in the certificate storage 28 with a new certificate (here, certificate Cn) in a certificate writing process RT2 (see FIG. 7) to be described later.

In step SP4, the controller 20 of the printer 10 compares the validity period of the certificate stored in the certificate storage 28 with information indicating the current date obtained from the clock 30, and proceeds to step SP5. In step SP5, the controller 20 determines whether the current date is within the validity period of the certificate and the certificate has not expired. When the determination is positive, this indicates that the certificate is unexpired and valid, and the controller 20 proceeds to step SP6. On the other hand, when the determination in step SP5 is negative, this indicates that the certificate is expired and invalid, and the controller 20 returns to step SP4. The controller 20 repeats steps SP4 and SP5, and periodically checks whether the certificate is valid.

In step SP6, the controller 20 controls the wireless communication unit 24 to deactivate the wireless access point, thereby restoring the printer 10 to the infrastructure mode, and proceeds to step SP7. In step SP7, the controller 20 uses the renewed certificate (here, certificate Cn) to ask the authentication server 14 for the IEEE 802.1X authentication, via the wired communication unit 22, and after the printer 10 is authenticated, the controller 20 is allowed to resume the connection to the network NT2, proceeds to step SP8, and ends the certificate renewal process RT1.

<1-3. Certificate Writing Process by PC>

Figure 7:
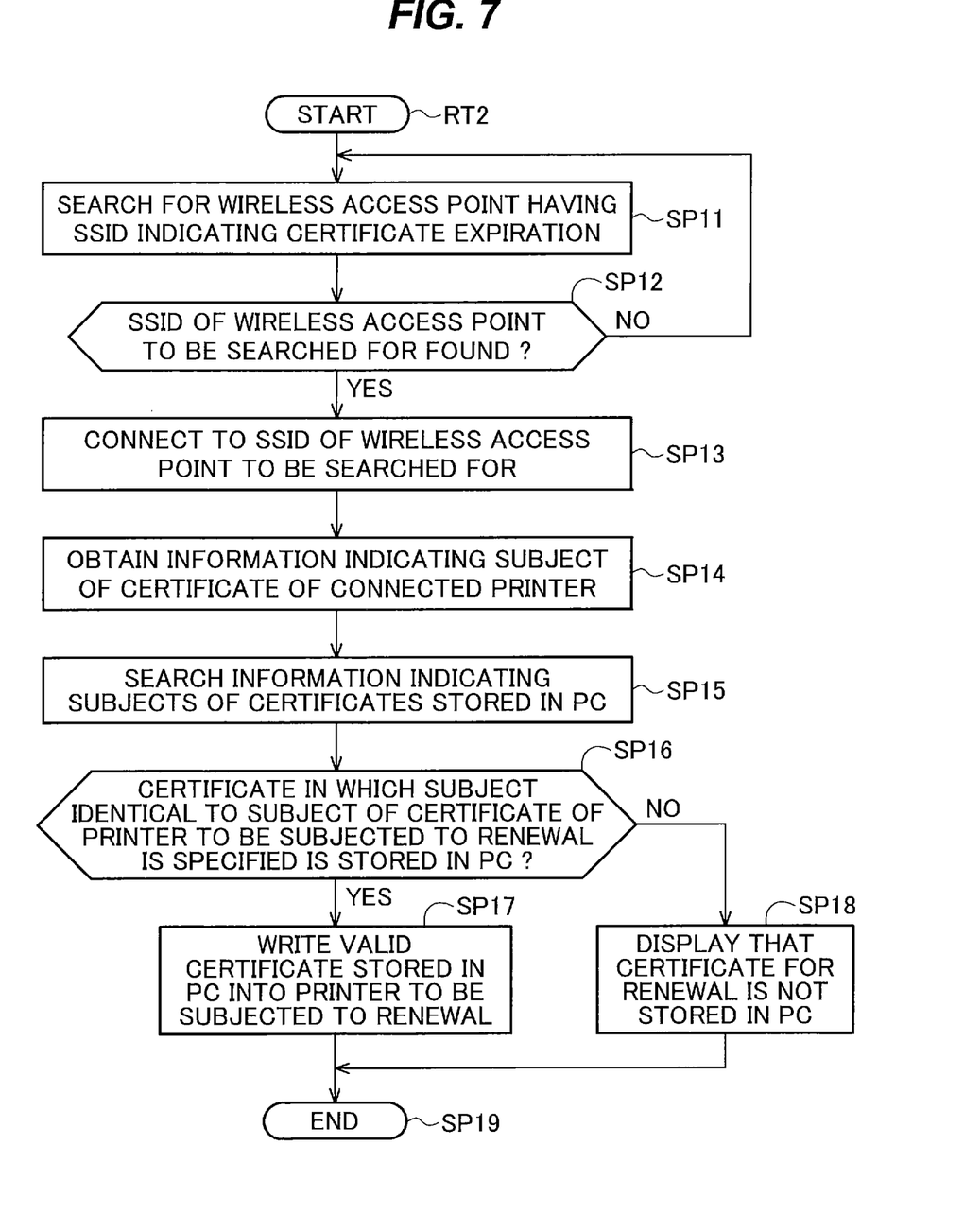
FIG. 7 is a flowchart illustrating a certificate writing process in the PC according to the first embodiment.

Next, a certificate writing process by the PC 16 will be described using the flowchart illustrated in FIG. 7. The certificate writing process is a process of finding the printer 10 with its certificate expired and writing a new certificate into the printer 10. The controller 40 starts the certificate writing process RT2 illustrated in FIG. 7 by reading a certificate writing program from the memory 49 and executing it, and proceeds to step SP11.

In step SP11, the controller 40 of the PC 16 searches for the wireless access point to be searched for having the SSID indicating that the certificate has expired, via the wireless communication unit 44, and proceeds to step SP12. In this embodiment, as described above, the SSID of the wireless access point activated by the printer 10 with its certificate expired is an SSID starting with "expired-". Thus, the controller 40 searches for a wireless access point having an SSID starting with "expired-".

In step SP12, the controller 40 determines whether the SSID of the wireless access point to be searched for has been found. When the determination is negative, this indicates that the SSID of the wireless access point to be searched for has not been found, and the controller 40 returns to step SP11. The controller 40 repeats steps SP11 and SP12, and periodically searches for the SSID of the wireless access point to be searched for. On the other hand, when the determination in step SP12 is positive, this indicates that the SSID of the wireless access point to be searched for has been found, and the controller 40 proceeds to step SP13. In step SP13, the controller 40 connects to the SSID of the wireless access point to be searched for, according to the WPA2-PSK protocol, using as a password a character string obtained by combining "key-" and the character string following "expired-" of the SSID, and proceeds to step SP14. In this embodiment, since the SSID of the wireless access point activated by the printer 10 is "expired-printer-1", the password is "key-printer-1".

In step SP14, the controller 40 obtains, from the printer 10 connected thereto, i.e., the printer 10 to be subjected to renewal of the certificate (hereinafter also referred to as the printer to be subjected to renewal), information indicating the subject of the certificate currently stored in the certificate storage 28 of the printer 10, and proceeds to step SP15. Here, the controller 40 obtains, from the printer 10, "Printer-1" as the information indicating the subject of certificate Co. In step SP15, on the basis of the obtained information (here, "Printer-1") indicating the subject of the certificate (here, certificate Co), the controller 40 searches information indicating the subjects of certificates stored in the certificate storage 48, and proceeds to step SP16.

In step SP16, the controller 40 determines whether a certificate in which a subject identical to the subject of the certificate (here, certificate Co) of the printer to be subjected to renewal is specified is stored in the certificate storage 48. When the determination is positive, this indicates that a certificate in which a subject identical to the subject of the certificate (here, certificate Co) of the printer to be subjected to renewal is specified is already stored in the certificate storage 48, and the controller 40 proceeds to step SP17. In step SP17, the controller 40 transmits the certificate (here, certificate Cn in FIG. 5) stored in the certificate storage 48, to the printer 10 via the wireless communication unit 44, replaces the expired certificate (here, certificate Co) in the printer 10 with the valid certificate (here, certificate Cn) by writing the valid certificate (here, certificate Cn) into the certificate storage 28 of the printer 10, proceeds to step SP19, and ends the certificate writing process RT2.

On the other hand, when the determination in step SP16 is negative, this indicates that although the printer to be subjected to renewal has been found, no certificate in which a subject identical to the subject of the certificate of the printer to be subjected to renewal is specified has been installed in the PC 16 and is stored in the certificate storage 48 (i.e., no certificate available for the renewal is stored), and the controller 40 proceeds to step SP18. In step SP18, the controller 40 informs a user of the PC 16 that a new certificate for renewing the certificate in the printer should be installed in the PC 16, by indicating on the display 50 that no certificate for the renewal is stored in the certificate storage 48, proceeds to step SP19, and ends the certificate writing process RT2.

<1-4. Advantages, Etc.>

In the above configuration, the electronic certificate renewal system 1 is configured to set the time to renew the certificate to the same date as the expiration date, and periodically determine whether the certificate has expired, and when it has expired (or when a specified time within a period from a time a predetermined time before expiration of the certificate to a time of expiration of the certificate has arrived), activate the printer 10 as a wireless access point and shift the printer 10 from the infrastructure mode to the access point mode, and after the PC 16 wirelessly connects to the printer 10 and renews the certificate by storing a valid certificate in the certificate storage 28 of the printer 10, restore the printer 10 to the infrastructure mode.

Thus, the electronic certificate renewal system 1 eliminates the need to impose an operation for renewing the certificate on a user, and can greatly save time and effort for the user to renew the certificate.

Conventionally, in a case where a device such as a printer is connected to a network using IEEE 802.1X authentication, when the electronic certificate of the device has expired, the device cannot communicate with the network using the authentication, and thus cannot obtain an electronic certificate from an apparatus connected via the network. Thus, in order to renew the electronic certificate of the device, it is necessary to manually connect an apparatus, such as a PC, to the device and renew the electronic certificate of the device from the apparatus, which takes time and effort.

On the other hand, the electronic certificate renewal system 1 is configured so that the printer 10 and PC 16 wirelessly connect directly to each other via the network NT4 in the access point mode and the certificate for renewal is transmitted from the PC 16 to the printer 10. Thus, in the electronic certificate renewal system 1, even when the certificate has expired, the printer 10 can communicate with the PC 16 and renew the certificate, without using the networks NT1 and NT2, requiring the certificate.

Also, the electronic certificate renewal system 1 is configured so that the certificate for renewal is transmitted to the printer 10 from the PC 16, which is connected to the printer 10 via the networks NT1 and NT2 and uses the printer 10 to print a print job. Thus, in the electronic certificate renewal system 1, it is possible to renew the certificate without separately providing a device for renewing the certificate that is a PC that is not connected to the networks NT1 and NT2 and is wirelessly connected to the printer 10. Thus, the electronic certificate renewal system 1 eliminates the need to provide a device dedicated to renewal of the certificate, which can prevent the system configuration from being complicated.

As above, the printer 10 includes the certificate storage 28 that stores an electronic certificate used for authentication for using the network NT2; the controller 20 that detects whether the time to renew the certificate has arrived; and the communication unit 21 having the infrastructure mode as the first communication mode in which the communication unit 21 communicates with the PC 16 as the external device via the network NT2, and the access point mode as the second communication mode in which the communication unit 21 communicates with the PC 16 as the certificate renewal device without using the network NT2. The communication unit 21 connects with the PC 16 in the access point mode and receives a certificate for renewing the certificate from the PC 16, on the basis of the detection by the controller 20 as to whether the time to renew the certificate has arrived.

Thereby, when the time to renew the certificate has arrived, the printer 10 can receive a certificate for renewing the certificate from the PC 16 via the network NT4, which does not require the certificate, and renew the certificate.

2. Second Embodiment

<2-1. Configuration of Electronic Certificate Renewal System>

As illustrated in FIG. 8, in which elements corresponding to those in FIG. 1 are given the same reference characters, an electronic certificate renewal system 101 of the second embodiment is different from the electronic certificate renewal system 1 of the first embodiment in that it includes the printer 110 instead of the printer 10 and additionally includes the certificate renewal device 60, but otherwise the same.

<2-1-1. Configuration of Printer>

As illustrated in FIG. 2, the printer 110 of the second embodiment is different from the printer 10 of the first embodiment in that it includes the controller 120 instead of the controller 20, but otherwise the same.

<2-1-2. Configuration of Certificate Renewal Device>

The certificate renewal device 60 is a personal computer that rewrites the certificate (e.g., certificate Co) installed in the certificate storage 28 of the printer 110 with a certificate (e.g., certificate Cn). The certificate renewal device 60 has a wireless communication function, and is located at a position where the certificate renewal device 60 can wirelessly communicate with the printer 110 when the printer 110 enters the access point mode and activates the wireless access point. The certificate renewal device 60 is not connected to any of the networks NT1, NT2, and NT3, and connected to the printer 110 via a network NT5 that is a wireless network.

Figure 9:
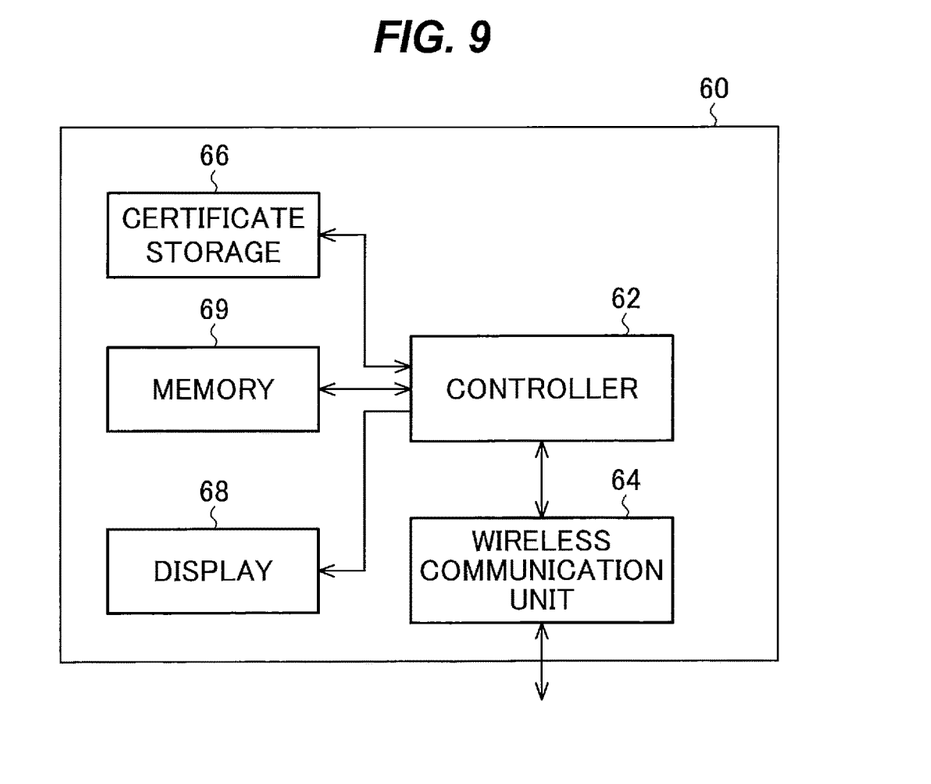
FIG. 9 is a block diagram illustrating a configuration of a certificate renewal device.

As illustrated in FIG. 9, the certificate renewal device 60 includes the controller 62, a wireless communication unit 64, a certificate storage 66, and a display 68. The controller 62, which is or includes a processor, such as a CPU, reads predetermined programs from the memory 69 and controls the certificate renewal device 60. The display 68, which is, for example, a liquid crystal display, displays a result of certificate renewal.

The wireless communication unit 64, which is, for example, a wireless LAN board installed in the certificate renewal device 60, establishes wireless communication according to Wi-Fi with the printer 110 operating as a wireless access point or other devices and transmits and receives data. The certificate storage 66 is a storage that stores a certificate (e.g., certificate Cn) for renewing the certificate (e.g., certificate Co) stored in the certificate storage 28 of the printer 110.

<2-2. Certificate Renewal Process by Printer>

Figure 6:
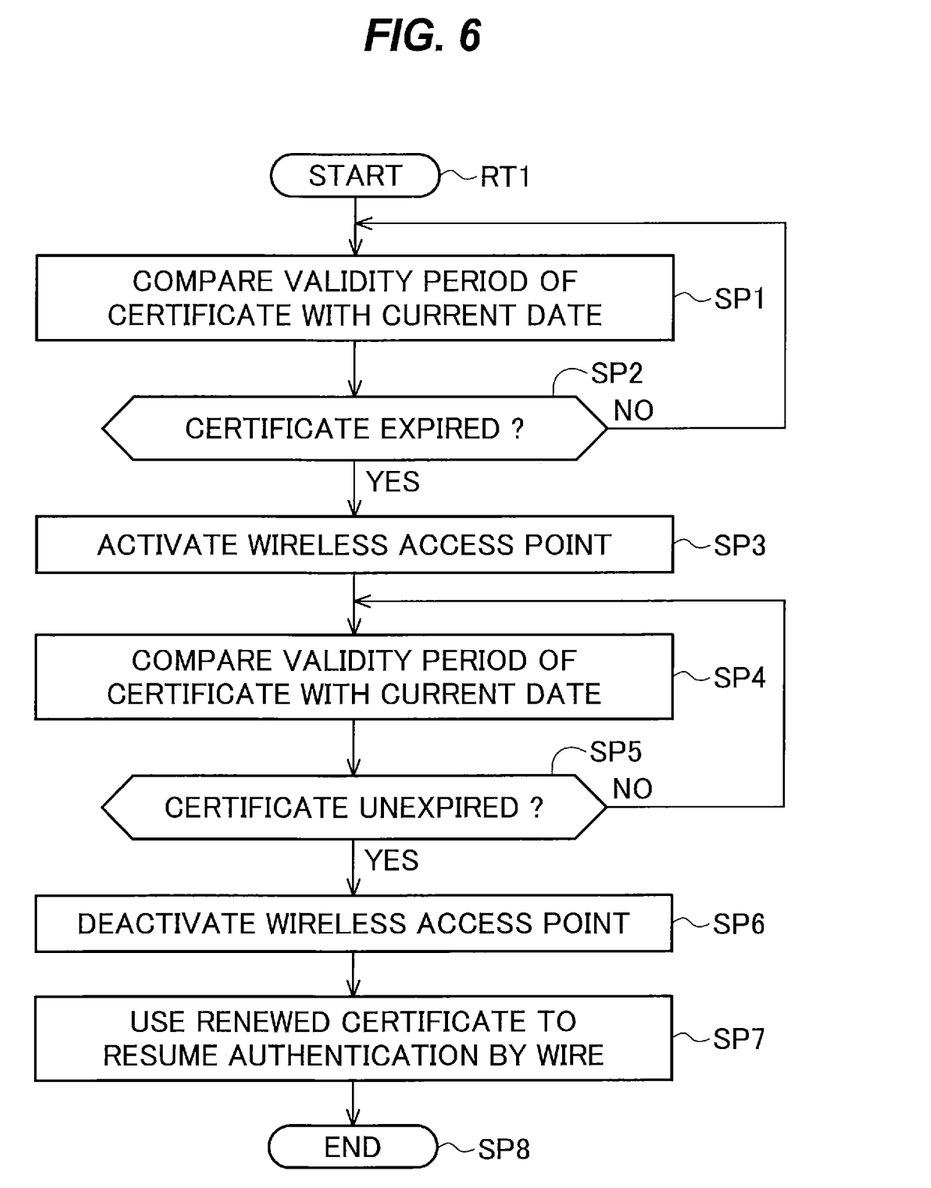
FIG. 6 is a flowchart illustrating a certificate renewal process in the printer according to the first embodiment.
Figure 10:
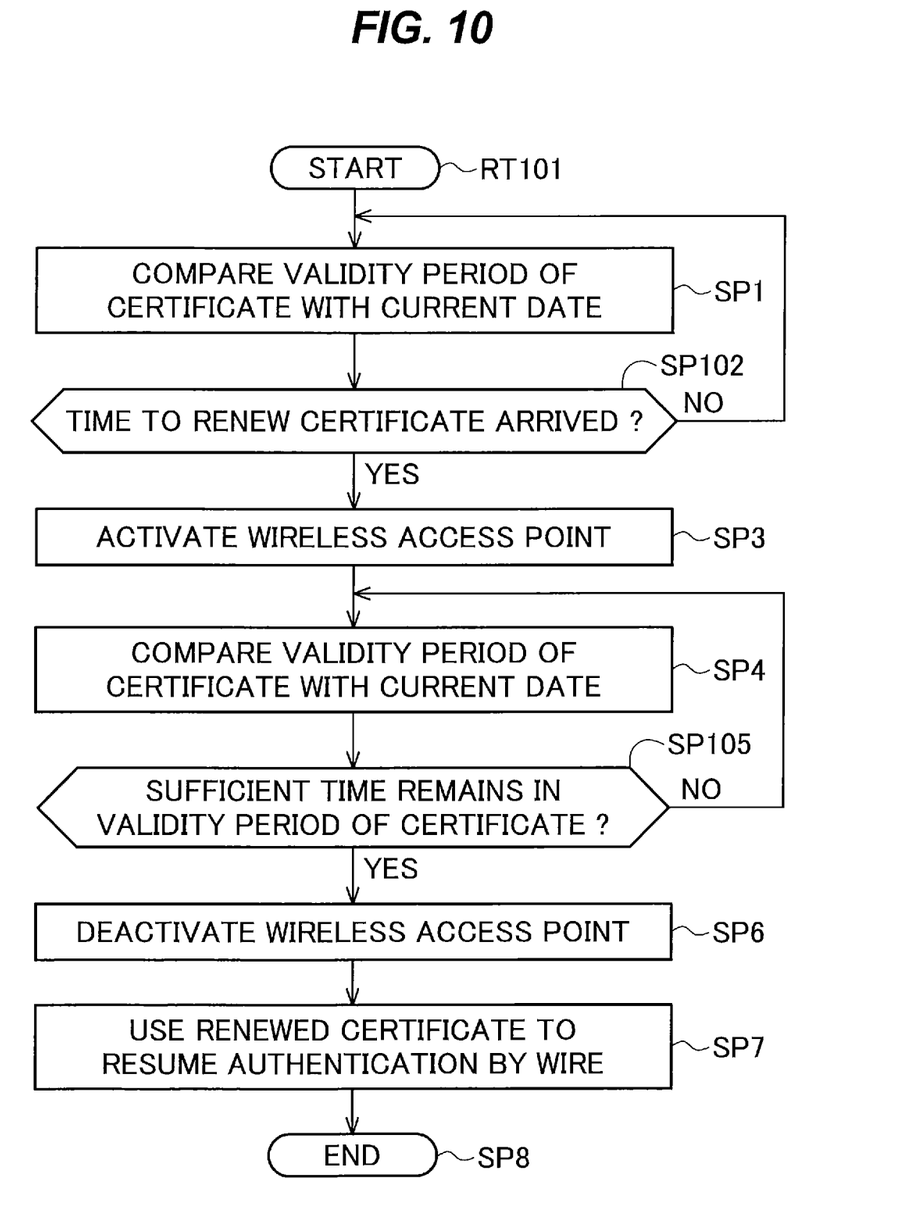
FIG. 10 is a flowchart illustrating a certificate renewal process in the printer according to the second embodiment.

Next, a certificate renewal process by the printer 110 will be described using the flowchart illustrated in FIG. 10, in which steps corresponding to those in FIG. 6 are given the same reference characters. The controller 120 starts a certificate renewal process RT101 illustrated in FIG. 10 by reading a certificate renewal program from the memory 39 and executing it, and proceeds to step SP1. In the certificate renewal process RT101, the controller 120 sets the time to renew the certificate stored in the certificate storage 28 to a date one month before the expiration date of the stored certificate, determines whether the time to renew the stored certificate has arrived (i.e., whether the date one month before the expiration date has arrived), and when the date one month before the expiration date has arrived, waits until a valid certificate is stored in the certificate storage 28 by the certificate renewal device 60.

Here, it is assumed that certificate Co is stored in the certificate storage 28 and the current date is 12/01/2020. In this case, the remaining time until the expiration date of the certificate (i.e., certificate Co) stored in the certificate storage 28 of the printer 110 is one month (i.e., the time to renew has just arrived), and on and after the date that is one month after the current date, the IEEE 802.1X authentication by the authentication server 14 is denied, and the printer 110 cannot connect to the network NT2. The following describes an operation until the certificate stored in the certificate storage 28 is renewed before the expiration and the printer 110 becomes able to connect to the network NT2 again.

In step SP1, the controller 120 of the printer 110 compares the validity period of the certificate stored in the certificate storage 28 with information indicating the current date obtained from the clock 30, and proceeds to step SP102. In step SP102, the controller 120 determines whether the current date is on or after the date one month before the expiration date of the certificate and the time to renew has arrived. When the determination is negative, this indicates that the time to renew has not arrived, and the controller 120 returns to step SP1. The controller 120 repeats steps SP1 and SP102, and periodically checks whether the time to renew has arrived. On the other hand, when the determination in step SP102 is positive, this indicates that the time to renew has arrived, and the controller 120 proceeds to step SP3. Here, since the current date is 12/01/2020 and one month before the expiration date of certificate Co, the controller 120 makes a positive determination in step SP102.

In step SP3, the controller 120 controls the wireless communication unit 24 to activate the wireless access point, thereby placing the printer 110 into the access point mode, and proceeds to step SP4.

When the printer 110 starts as a wireless access point, the certificate renewal device 60 wirelessly connects to the printer 110 and replaces the certificate (here, certificate Co) in the certificate storage 28 with a new certificate (here, certificate Cn) in a certificate writing process RT102 (see FIG. 11) to be described later.

In step SP4, the controller 120 of the printer 110 compares the validity period of the certificate stored in the certificate storage 28 with information indicating the current date obtained from the clock 30, and proceeds to step SP105. In step SP105, the controller 120 determines whether the current date is before the date that is one month before the expiration date of the certificate and sufficient time remains in the validity period of the certificate. When the determination is positive, this indicates that there is sufficient time before the expiration date of the certificate, and the controller 120 proceeds to step SP6. On the other hand, when the determination in step SP105 is negative, this indicates that there is insufficient time before the expiration date of the certificate, and the controller 120 returns to step SP4. The controller 120 repeats steps SP4 and SP105, and periodically checks whether the time until the expiration date of the certificate stored in the certificate storage 28 is longer than one month.

In step SP6, the controller 120 controls the wireless communication unit 24 to deactivate the wireless access point, thereby restoring the printer 110 to the infrastructure mode, and proceeds to step SP7. In step SP7, the controller 120 uses the renewed certificate (here, certificate Cn) to ask the authentication server 14 for the IEEE 802.1X authentication, via the wired communication unit 22, and after the printer 110 is authenticated, the controller 120 is allowed to resume the connection to the network NT2, proceeds to step SP8, and ends the certificate renewal process RT101.

<2-3. Certificate Writing Process by Certificate Renewal Device>

Figure 11:
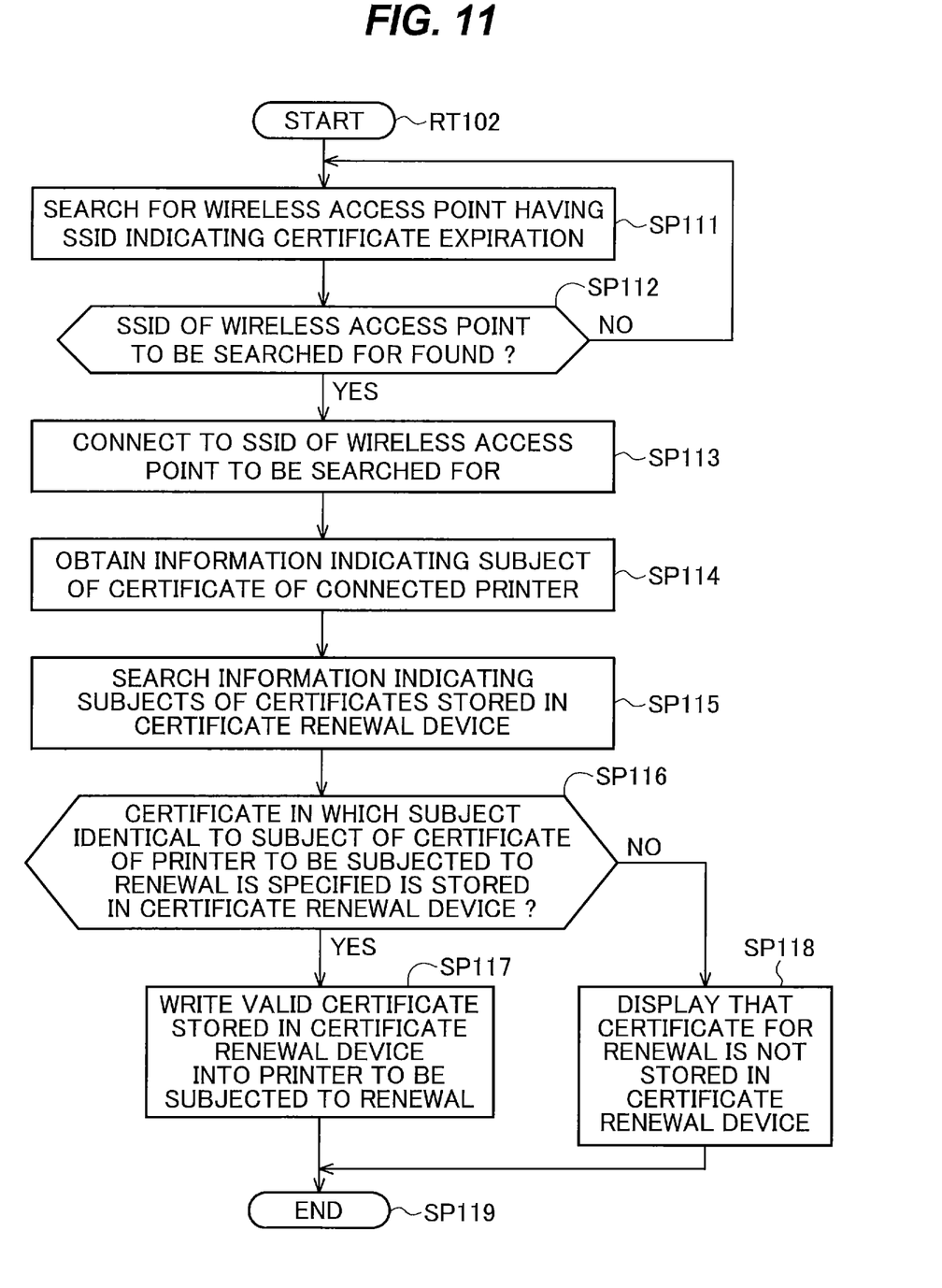
FIG. 11 is a flowchart illustrating a certificate writing process in the certificate renewal device according to the second embodiment.

Next, a certificate writing process by the certificate renewal device 60 will be described using the flowchart illustrated in FIG. 11, which corresponds to FIG. 7. The controller 62 starts the certificate writing process RT102 illustrated in FIG. 11 by reading a certificate writing program from the memory 69 and executing it, and proceeds to step SP111.

In step SP111, the controller 62 of the certificate renewal device 60 searches for the wireless access point to be searched for, via the wireless communication unit 64, and proceeds to step SP112. In step SP112, the controller 62 determines whether the SSID of the wireless access point to be searched for has been found. When the determination is negative, this indicates that the SSID of the wireless access point to be searched for has not been found, and the controller 62 returns to step SP111. The controller 62 repeats steps SP111 and SP112, and periodically searches for the SSID of the wireless access point to be searched for. On the other hand, when the determination in step SP112 is positive, this indicates that the SSID of the wireless access point to be searched for has been found, and the controller 62 proceeds to step SP113. In step SP113, the controller 62 connects to the SSID of the wireless access point to be searched for, and proceeds to step SP114.

In step SP114, the controller 62 obtains, from the printer 110 that is connected thereto and a printer to be subjected to renewal, information indicating the subject of the certificate (here, certificate Co in FIG. 4) currently stored in the certificate storage 28 of the printer 110, and proceeds to step SP115. In step SP115, on the basis of the obtained information (here, "Printer-1") indicating the subject of the certificate (here, certificate Co), the controller 62 searches information indicating the subjects of certificates stored in the certificate storage 66, and proceeds to step SP116.

In step SP116, the controller 62 determines whether a certificate in which a subject identical to the subject of the certificate (here, certificate Co) of the printer to be subjected to renewal is specified is stored in the certificate storage 66. When the determination is positive, this indicates that a certificate in which a subject identical to the subject of the certificate (here, certificate Co) of the printer to be subjected to renewal is specified is already stored in the certificate storage 66, and the controller 62 proceeds to step SP117. In step SP117, the controller 62 transmits the certificate (here, certificate Cn in FIG. 5) stored in the certificate storage 66, to the printer 110 via the wireless communication unit 64, replaces the expired certificate (here, certificate Co) in the printer 110 with the valid certificate (here, certificate Cn) by writing the valid certificate (here, certificate Cn) into the certificate storage 28 of the printer 110, proceeds to step SP119, and ends the certificate writing process RT102.

On the other hand, when the determination in step SP116 is negative, this indicates that although the printer to be subjected to renewal has been found, no certificate in which a subject identical to the subject of the certificate of the printer to be subjected to renewal is specified has been installed in the certificate renewal device 60 and is stored in the certificate storage 66 (i.e., no certificate available for the renewal is stored), and the controller 62 proceeds to step SP118. In step SP118, the controller 62 informs a user of the certificate renewal device 60 that a new certificate for renewing the certificate in the printer should be installed in the certificate renewal device 60, by indicating on the display 68 that no certificate for the renewal is stored in the certificate storage 66, proceeds to step SP119, and ends the certificate writing process RT102.

<2-4. Advantages, Etc.>

In the above configuration, the electronic certificate renewal system 101 is configured so that the time to renew the certificate is set to a date one month before the expiration date, and when the date one month before the expiration date has arrived (or when a specified time within a period from a time a predetermined time before expiration of the certificate to a time of expiration of the certificate has arrived), the certificate renewal device 60 stores a valid certificate in the certificate storage 28 of the printer 110.

Thus, the electronic certificate renewal system 101 can renew the certificate with a new certificate before the certificate expires. Thereby, the electronic certificate renewal system 101 can eliminate the period in which the printer 110 cannot connect to the network NT2 due to expiration of the certificate, and can reduce inconvenience to a user more than the electronic certificate renewal system 1.

Moreover, the electronic certificate renewal system 101 of the second embodiment can provide the same effects and advantages as the electronic certificate renewal system 1 of the first embodiment.

3. Other Embodiments

In the above second embodiment, the certificate renewal device 60 may be omitted so that the electronic certificate renewal system 101 has a similar configuration to the electronic certificate renewal system 1, and when the date one month before the expiration date of the certificate has arrived, the PC 16 may write the new certificate in the printer 110, as with the first embodiment.

In the above first embodiment, the new certificate is transmitted to the printer 10 from a personal computer. However, the present disclosure is not limited to this. The new certificate may be transmitted to the printer 10 from another device, such as a mobile terminal or portable terminal, such as a smartphone or tablet, having a wireless communication function. When the new certificate is transmitted to the printer 10 from a portable terminal having an NFC communication unit, the electronic certificate renewal system 1 may be configured as follows. The fact that the time to renew the certificate has arrived is displayed on the display operation unit 32 of the printer 10 or a display operation unit of the portable terminal. When the NFC communication unit of the portable terminal is placed over the NFC communication unit 26 of the printer 10, a request to renew the certificate is transmitted from the printer 10 to the portable terminal via NFC communication, and then the new certificate is transmitted from the portable terminal to the printer 10 via NFC communication. The same applies to the second embodiment.

In the above first embodiment, techniques of the present disclosure are applied to the electronic certificate renewal system 1 in which when the certificate installed in the printer 10 has expired, the certificate is renewed with a new certificate by the PC 16. However, the present disclosure is not limited to this. Techniques of the present disclosure may be applied to an electronic certificate renewal system in which when the certificate is not installed in the printer 10 (i.e., when the certificate is not stored in the certificate storage 28), a certificate that is a valid electronic certificate to be initially installed in the printer 10 is installed in the printer 10 by the PC 16. The same applies to the second embodiment.

In the above first embodiment, when the certificate stored in the printer 10 is expired, the authentication server 14 determines that the certificate is invalid, and does not authenticate the printer 10. However, the present disclosure is not limited to this. For example, the authentication server 14 may be configured so that regardless of the expiration date of the certificate stored in the printer 10, when the certificate has a specific serial number or public key, the authentication server 14 determines that the certificate is invalid, and does not authenticate the printer 10. In this case, when the certificate is renewed with a new certificate so that the serial number or public key is renewed, the authentication server 14 determines that the renewed certificate is valid, and authenticates the printer 10. Thus, techniques of the present disclosure may be applied to an electronic certificate renewal system in which regardless of the expiration date, when the certificate is determined by the authentication server 14 to be invalid on the basis of other information item(s) of the certificate, a new certificate as a valid electronic certificate is installed in the printer 10 by the PC 16. The same applies to the second embodiment.

In the above first embodiment, the short-distance wireless communication between the printer 10 and the PC 16 is performed according to Wi-Fi. However, the present disclosure is not limited to this. The short-distance wireless communication between the printer 10 and the PC 16 may be performed according to another communication protocol, such as Bluetooth (registered trademark) or ZigBee (registered trademark). The same applies to the second embodiment.

In the above first embodiment, the networks NT1, NT2, and NT3 are wired communication networks. However, the present disclosure is not limited to this. At least one of the networks NT1, NT2, and NT3 may be wireless communication network. The same applies to the second embodiment.

In the above first embodiment, in the access point mode, the printer 10 and PC 16 perform wireless communication. However, the present disclosure is not limited to this. In the access point mode, the printer 10 and PC 16 may perform a wired communication that does not require the authentication by the authentication server 14. The same applies to the second embodiment.

In the above first embodiment, techniques of the present disclosure are applied to the electronic certificate renewal system 1 that renews the client certificate installed in the printer 10. However, the present disclosure is not limited to this. Techniques of the present disclosure may be applied to an electronic certificate renewal system that renews another certificate, such as a certificate for server verification, installed in the printer 10. The certificate for server verification is, for example, such that in accessing the printer 10 functioning as a server from the PC 16 to view a Web page regarding the printer 10, when the certificate for server verification is not installed in the printer 10 or invalid, the fact is displayed on the PC 16, and the PC 16 is prevented from accessing the printer 10. The same applies to the second embodiment.

In the above first embodiment, techniques of the present disclosure are applied to the printer 10. However, the present disclosure is not limited to this. Techniques of the present disclosure may be applied to other image forming apparatuses, such as copiers, facsimile machines, or multi-function peripherals (MFPs) having functions, such as copier and facsimile functions, having various functions. Also, techniques of the present disclosure may be applied to other various electronic devices, such as home electric appliances or sensors, that perform network communication. The same applies to the second embodiment.

The present disclosure is not limited to the above embodiments. Specifically, the scope of the present disclosure covers embodiments obtained by arbitrarily combining some or all of the above embodiments. Also, the scope of the present disclosure covers embodiments obtained by extracting part of the configuration described in one of the above embodiments and replacing part of the configuration of another of the above embodiments with the extracted part, and embodiments obtained by extracting part of the configuration described in one of the above embodiments and adding the extracted part to another of the above embodiments.

In the above first embodiment, the printer 10 as an information processing device is constituted by the certificate storage 28 as a storage, the controller 20 as a detector, and the communication unit 21. However, the present disclosure is not limited to this. Information processing devices may be constituted by storages, detectors, and communication units that have other various configurations.

The present disclosure is applicable to various systems in which an electronic certificate installed in an information processing device is renewed.

What is claimed is:

1. An information processing device, comprising:
   a storage that stores an electronic certificate used for authentication for the information processing device to be authorized to use a network;
   a detector configured to detect whether a time to renew the electronic certificate has arrived; and
   a communication unit having a first communication mode in which the communication unit communicates with an external device via the network using the electronic certificate and a second communication mode in which the communication unit communicates with a certificate renewal device without using the network, wherein
   upon detecting, by the detector, that the time to renew the electronic certificate has arrived, the communication unit connects with the certificate renewal device in the second communication mode in which the information processing device operates as an access point and receives an electronic certificate for renewing the electronic certificate from the certificate renewal device.

2. The information processing device of claim 1, further comprising a generator configured to generate connection information for connecting with the certificate renewal device in the second communication mode, wherein
   the communication unit communicates with the certificate renewal device in the second communication mode on a basis of the connection information.

3. The information processing device of claim 2, wherein the communication unit communicates with the certificate renewal device in the second communication mode on a basis of the connection information, via short-distance wireless communication.

4. The information processing device of claim 1, wherein
   upon detecting that a period from a current time to a time of expiration of the electronic certificate has become less than a predetermined time period, the detector detects that the time to renew the electronic certificate has arrived, and
   when the detector detects that the time to renew the electronic certificate has arrived, the communication unit connects with the certificate renewal device in the second communication mode and receives the electronic certificate for renewing the electronic certificate from the certificate renewal device.

5. The information processing device of claim 4, wherein when the electronic certificate has expired, the detector detects that the time to renew the electronic certificate has arrived.

6. The information processing device of claim 4, wherein upon detecting that a remaining time period before expiration of the electronic certificate has become equal to or less than a predetermined time period, the detector detects that the time to renew the electronic certificate has arrived.

7. The information processing device of claim 1, wherein the external device and the certificate renewal device are the same device.

8. The information processing device of claim 1, wherein
   the electronic certificate is used for the authentication for using a first network, and
   the communication unit communicates with the external device via the first network using the electronic certificate in the first communication mode, and communicates with the certificate renewal device using a second network different from the first network.

9. A non-transitory computer-readable storage medium storing a program for causing a computer to execute the program, the program including instructions:
   detecting a request from an information processing device for an electronic certificate used for authentication for using a network;
   connecting with the information processing device without using the network in response to the request; and
   transmitting the electronic certificate to the connected information processing device, wherein
   the detecting includes detecting a service set identifier of the information processing device as the request from the information processing device, and
   the connecting includes connecting with the information processing device by using a password corresponding to the service set identifier.

10. The non-transitory computer-readable storage medium of claim 9, wherein
    the instructions further comprise obtaining identification information for the information processing device held by the information processing device, and
    the transmitting includes transmitting, to the information processing device, the electronic certificate corresponding to the identification information.

* * * * *